Oct. 28, 1958
W. LORIMER
2,858,026
FILTER AND FILTER CARTRIDGE
Filed Oct. 24, 1955
2 Sheets-Sheet 1
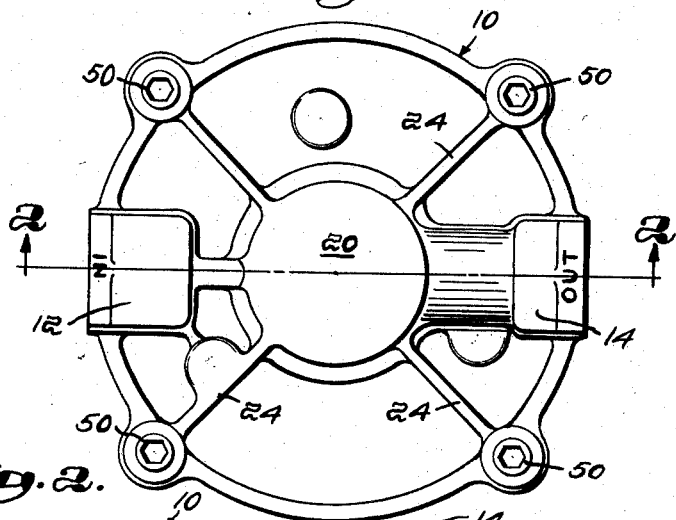
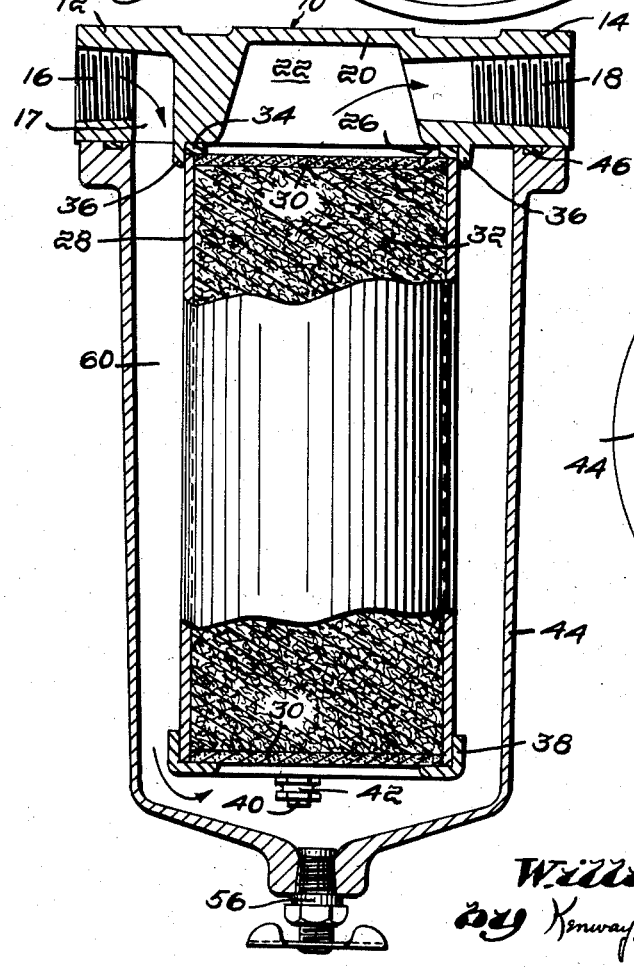
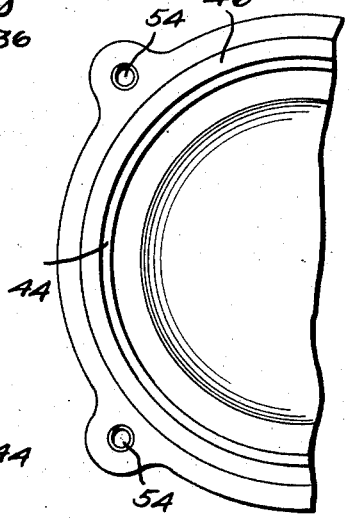
Inventor:
William Lorimer,
by Kenway, Jenney, Witter & Hildreth
Attorneys

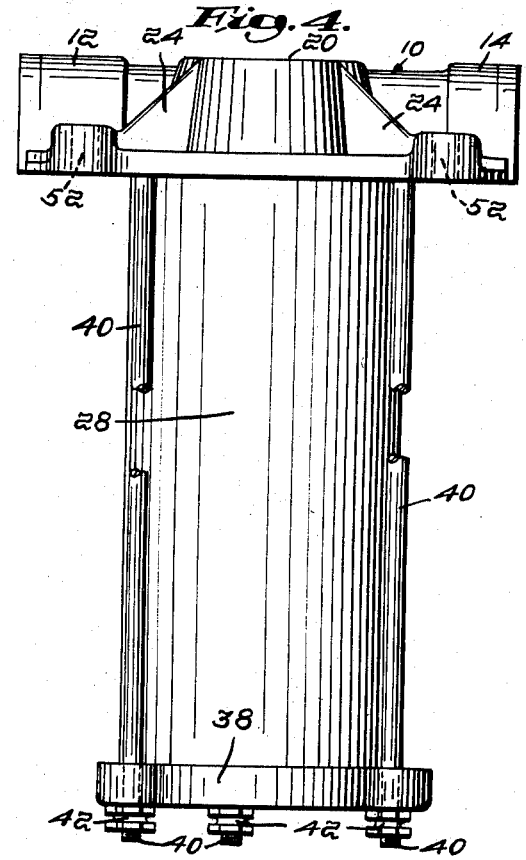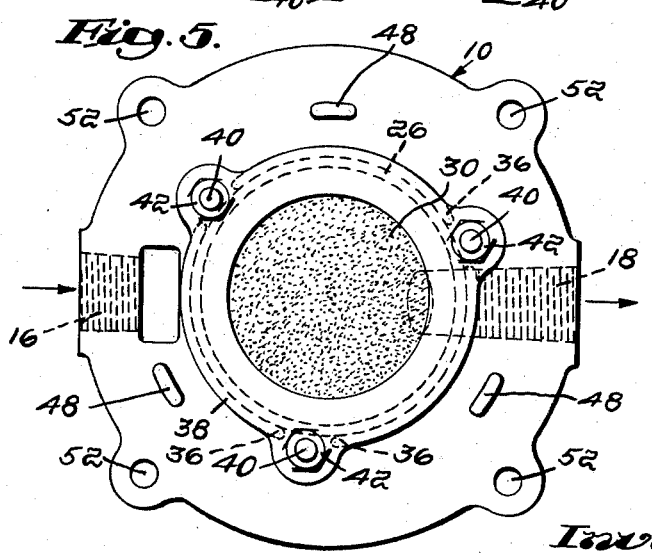

2,858,026

FILTER AND FILTER CARTRIDGE

William Lorimer, Needham, Mass., assignor of one-half to Eleanor G. Armstrong, Boston, Mass.

Application October 24, 1955, Serial No. 542,315

1 Claim. (Cl. 210—444)

This invention relates to a novel filter for air, water or other fluid and to a removable filter cartridge employed therein. The filter embodies a head having fluid entrance and exit passages for coupling the filter into the fluid carrying pipe, together with the means for detachably supporting the filter cartridge in abutting relation against the head and disposed to conduct the piped fluid through the cartridge from the entrance to the exit passages in the head.

The head comprises a disk-like member having relatively thickened portions providing said entrance and exit passages and a chamber therebetween for receiving filtered fluid from the cartridge. The cartridge is a tubular member housing filtering material therein and embodying a fluid impervious cylindrical wall with filter screens at its ends, and a cup-like housing attached to the head and enclosing the cartridge is disposed to conduct the fluid from the entrance passage through the cartridge and to the exit passage. The filter is adapted thus continuously to filter the piped fluid and the cartridge can be conveniently removed and replaced with another cartridge when required. The production of a novel filter and cartridge of this nature as and for the purpose described comprises the primary object of the invention.

These and other features of the invention will be best understood and appreciated from the following description of a preferred embodiment thereof, selected for purposes of illustration and shown in the accompanying drawings, in which:

Fig. 1 is a plan view of my novel filter,

Fig. 2 is a longitudinal sectional view therethrough taken on line 2—2 of Fig. 1, Fig. 3 is a fragmentary top end view of a cup-like housing employed in the filter, Fig. 4 is a side elevation of the filter cartridge supported on the filter head, and Fig. 5 is a bottom plan view thereof.

The filter embodies a disk-like head 10 having oppositely disposed thickened portions 12 and 14 providing entrance and exit passages 16 and 18 for the fluid, the passages being threaded as shown in Fig. 2 for coupling into a fluid carrying pipe. The head is also thickened at 20 between said portions 12 and 14 to provide a centrally disposed chamber 22 between the passages 16 and 18 and open to the passage 18 and to the bottom face of the head. The head is a casting and includes integral reinforcing ribs 24. The passage 16 is open at its inner end at 17 to the bottom face of the head as shown in Fig. 2 and an annular ledge 26 is provided at such face around the chamber 22.

The filtering cartridge for cooperating with the head is of tubular construction and embodies a substantially fluid impervious cylindrical wall 28 closed at its ends by sintered bronze disks 30 fixed to the tube and enclosing suitable filtering material 32 which will ordinarily include specially treated activated carbon.

One end of the cartridge is adapted to seat on the annular ledge 26 with a gasket 34 therebetween and within guide ribs 36 integral with the head. The cartridge is supported firmly in this position by an annulus 38 seated against the bottom end of the cartridge and supported by rods 40 threaded into the head and having nuts 42 on their bottom ends abutting the annulus.

A cup-like housing 44 is removably affixed to the head and encloses the cartridge as illustrated in Fig. 2. The top open end of the cup has a flat surface for engaging in surface contact with the bottom face of the head and is annularly recessed to receive an annular gasket 46. Spaced studs 48 integral with the head project outwardly of the bottom face in position to engage the inner wall of the cup, thus locating the cup at the head. The cup is secured to the head by tap screws 50 extending through openings 52 in the head and threaded into the cup at 54. The cup wall is spaced from the filtering cartridge as illustrated in Fig. 2 and is provided with a drainage plug 56.

It will be apparent that fluid entering the head at 16 passes downwardly through the opening 17 in the head into the cup chamber 60 and upwardly through the filtering cartridge to the chamber 22 and exit passage 18, the direct and full exposure of the open top end area of the cartridge to the chamber greatly facilitating the flow of fluid through the filter. The simplicity of the construction furthermore renders the filter very economical to manufacture and service. The head is easily installed in the fluid line and the cartridge body and cartridge containing chamber 60 can be of any size and length suitable to the function to be performed. It will also be apparent that the cartridge can be conveniently and quickly changed to provide different filtering materials and renewals as required.

The filter is adapted to serve various functions such as the purification of compressed air and the elimination of moisture and pipe scale from compressed air lines, the filtering material furthermore serving to equalize the flow of air. The filter is particularly adapted also to function in the purification of drinking water and trap any traces of chlorine, objectionable odors, certain types of bacteria and other objectionable elements. The size of particles permitted to pass through the filtering bronze screens 30 in gas filtration can be regulated from 60 to 6 microns and in liquid filtering from 25 to 6 microns.

Having thus disclosed my invention what I claim as new and desire to secure by Letters Patent is:

A fluid filter comprising a head having a chamber therein open at one face only of the head and having an outwardly facing annular ledge at said face disposed about the margin of the chamber, a tubular filter cartridge open at one end and having its tubular wall at said end in end to end abutting relation with said ledge, said tubular wall being substantially impervious to the passage of fluid therethrough and having filtering material therein admitting the passage of fluid longitudinally through the cartridge, an annulus in supporting engagement with the tubular wall of the cartridge at the end remote from the head, a plurality of rods secured at one end to the head and disposed in spaced relation about and parallel with the cartridge and extending through the annulus, nuts threaded to the rods for supporting the annulus and holding the cartridge with its said one end in tight engagement with the ledge, a cup-like member removably attached to the head and providing a fluid impervious housing about and spaced from the cartridge, and means providing an inlet passage through the head to the interior of the housing exteriorly of the cartridge and an exit passage from said chamber.

References Cited in the file of this patent

UNITED STATES PATENTS

| | | |
|---|---|---|
| 1,515,080 | Strachan | Nov. 11, 1924 |
| 2,563,548 | Plante | Aug. 7, 1951 |
| 2,772,002 | Mauro | Nov. 27, 1956 |